United States Patent
Knapp et al.

(10) Patent No.: US 7,508,640 B2
(45) Date of Patent: Mar. 24, 2009

(54) METHOD FOR FAULT HANDLING IN A CONVERTER CIRCUIT FOR WIRING OF THREE VOLTAGE LEVELS

(75) Inventors: Gerold Knapp, Ehrendingen (CH); Gerhard Hochstuhl, Waldshut-Tiengen (DE); Rudolf Wieser, Baden-Dättwil (CH); Luc Meysenc, Le Fontanil (FR)

(73) Assignee: ABB Schweiz AG, Baden (CH)

( * ) Notice: Subject to any disclaimer, the term of this patent is extended or adjusted under 35 U.S.C. 154(b) by 154 days.

(21) Appl. No.: 11/640,228

(22) Filed: Dec. 18, 2006

(65) Prior Publication Data

US 2008/0204959 A1 Aug. 28, 2008

Related U.S. Application Data

(63) Continuation of application No. PCT/CH2005/000203, filed on Apr. 11, 2005.

(30) Foreign Application Priority Data

Jun. 18, 2004 (EP) .................................. 04405373

(51) Int. Cl.
*H02H 3/08* (2006.01)
(52) U.S. Cl. ..................... 361/93.1; 361/18; 361/30; 361/79
(58) Field of Classification Search .............. 361/18, 361/23, 30, 31, 79, 87, 93.1
See application file for complete search history.

(56) References Cited

U.S. PATENT DOCUMENTS 6,369,543 B1 * 4/2002 Masselus et al. ............ 318/700

(Continued)

FOREIGN PATENT DOCUMENTS

DE 42 18 749 A1 12/1993

(Continued)

OTHER PUBLICATIONS

International Preliminary Report on Patentability dated Mar. 1, 2007 for PCT/CH2005/000203.
International Search Report Apr. 2005.

*Primary Examiner*—Stephen W Jackson
*Assistant Examiner*—Christopher J Clark
(74) *Attorney, Agent, or Firm*—Buchanan Ingersoll & Rooney PC (57) ABSTRACT

The document specifies a method for fault handling in a converter circuit for switching three voltage levels, in which the converter circuit has a converter subsystem provided for each phase (R,S,T), in which a top fault current path (A) or a bottom fault current path (B) in the converter subsystem is detected, the top fault current path (A) running through the first, second, third and sixth power semiconductor switches in the converter subsystem or through the first and fifth power semiconductor switches (S1, S5) in the converter subsystem, and the bottom fault current path (B) running through the second, third, fourth and fifth power semiconductor switches in the converter subsystem or through the fourth and sixth power semiconductor switches in the converter subsystem, and in which the power semiconductor switches are switched on the basis of a fault switching sequence. To avoid phase shorting of all the phases of the converter circuit in order to achieve a safe operating state for the converter circuit in the event of a fault, the fault switching sequence in the event of detection of the top or the bottom fault current path (A, B) is initially followed by the detection's accompanying switching status of each power semiconductor switch being recorded. In addition, in the event of detection of the top fault current path (A) the first power semiconductor switch and then the third power semiconductor are turned off, and in the event of detection of the bottom fault current path (B) the fourth power semiconductor switch and then the second power semiconductor are turned off.

15 Claims, 6 Drawing Sheets

U.S. PATENT DOCUMENTS

| | | | |
|---|---|---|---|
| 6,392,907 B1 * | 5/2002 | Ichikawa | 363/98 |
| 6,747,881 B2 * | 6/2004 | Schreiber | 363/37 |
| 7,049,787 B2 * | 5/2006 | Knapp et al. | 318/801 |
| 7,339,803 B2 * | 3/2008 | Nojima | 363/37 |
| 2003/0086231 A1 * | 5/2003 | Asaeda et al. | 361/93.9 |
| 2006/0197491 A1 * | 9/2006 | Nojima | 318/801 |
| 2007/0159749 A1 * | 7/2007 | Oka | 361/93.1 |

FOREIGN PATENT DOCUMENTS

| | | |
|---|---|---|
| DE | 699 02 227 T2 | 5/1999 |
| EP | 1 398 861 A1 | 3/2004 |
| JP | 11-32426 A | 2/1999 |
| JP | 11-032426 A | 2/1999 |

\* cited by examiner

Fig. 1a

CONVENTIONAL ART

Fig. 1b

CONVENTIONAL ART

METHOD FOR FAULT HANDLING IN A CONVERTER CIRCUIT FOR WIRING OF THREE VOLTAGE LEVELS

CROSS REFERENCE TO RELATED APPLICATIONS

This application claims priority under 35 U.S.C. §119 to EP Application 04405373.4 filed in Europe on 18 Jun. 2004, and as a continuation application under 35 U.S.C. §120 to PCT/CH2005/000203 filed as an International Application on 11 Apr. 2005 designating the U.S., the entire contents of which are hereby incorporated by reference in their entireties.

FIELD

Actuation methods for converter circuits are disclosed. Specifically, a method for fault handling in a converter circuit for switching three voltage levels is disclosed.

BACKGROUND INFORMATION

Figure 1A:
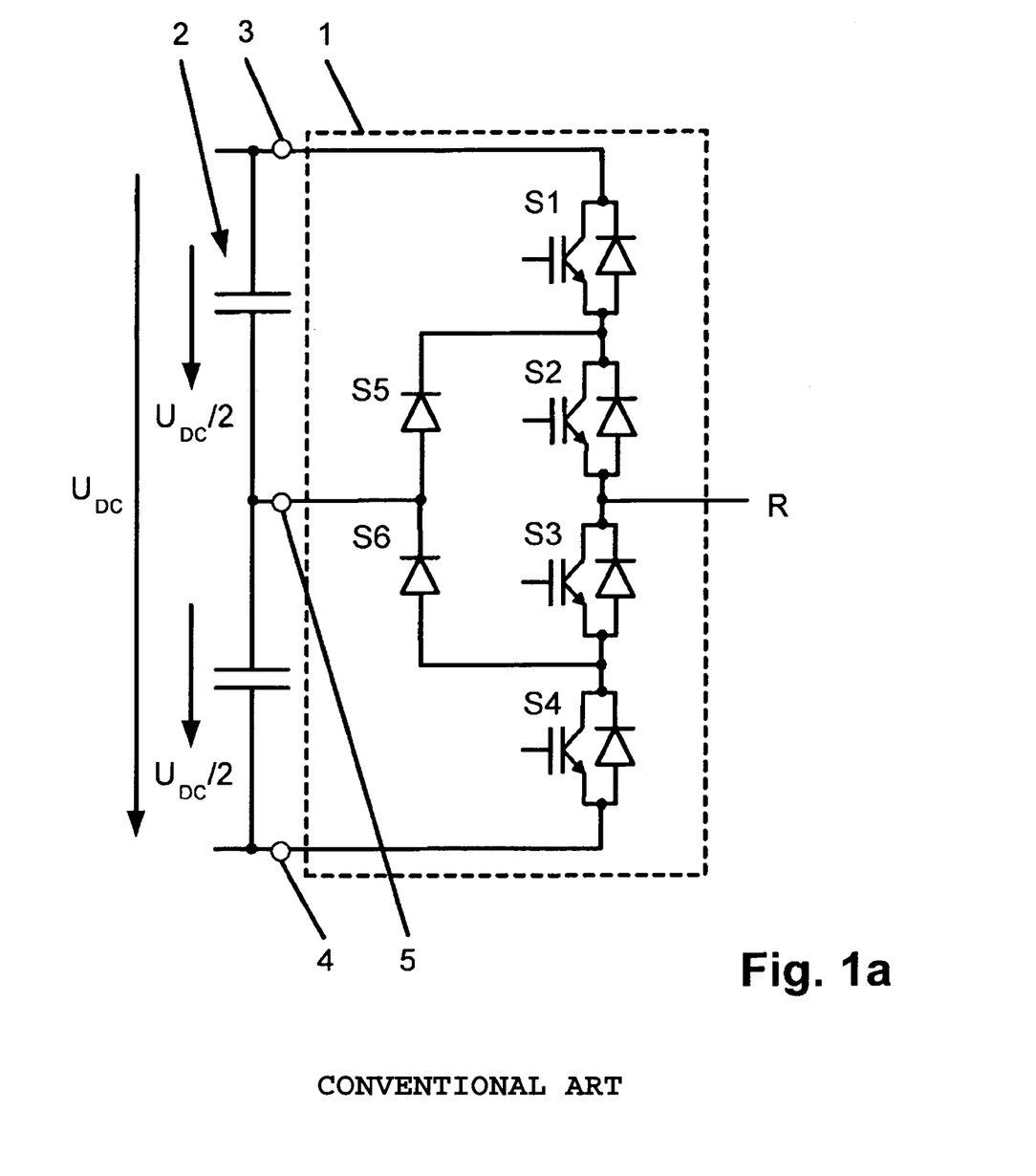
FIG. 1a shows an exemplary converter subsystem in a known converter circuit for switching three voltage levels.

Power semiconductor switches are currently being used increasingly in converter technology and particularly in converter circuits for switching three voltage levels. Such a converter circuit for switching three voltage levels is specified in DE 699 02 227 T2. FIG. 1a shows a converter subsystem for a phase of the converter circuit, where the converter subsystem shown in FIG. 1a corresponds to a converter subsystem from DE 699 02 227 T2. As FIG. 1a shows, the converter circuit is provided with a DC voltage circuit formed by two series-connected capacitors, the DC voltage circuit having a first principal connection and a second principal connection and a subconnection formed by the two adjacent and interconnected capacitors. The capacitance value of the two capacitors is usually chosen to be the same. The first principal connection and the second principal connection have a DC voltage applied between them, with half the DC voltage $U_{DC}/2$ therefore being applied between the first principal connection and the subconnection, i.e. to the one capacitor, and half the DC the DC voltage likewise being applied between the subconnection and the second principal connection, i.e. to the other capacitor. The DC voltage is denoted by $U_{DC}$ in FIG. 1a.

Each converter subsystem in the converter circuit from DE 699 02 227 T2 or from FIG. 1a has a first, a second, a third, a fourth, a fifth and a sixth power semiconductor switch, the first, second, third and fourth power semiconductor switches being connected in series and the first power semiconductor switch being connected to the first principal connection and the fourth power semiconductor switch being connected to the second principal connection. The junction between the second power semiconductor switch and the third power semiconductor switch forms a phase connection. In addition, the fifth and sixth power semiconductor switches are connected in series and form a clamping switching group, the junction between the fifth power semiconductor switch and the sixth power semiconductor switch being connected to the subconnection, the fifth power semiconductor switch being connected to the junction between the first power semiconductor switch and the second power semiconductor switch, and the sixth power semiconductor switch being connected to the junction between the third power semiconductor switch and the fourth power semiconductor switch. The first, second, third and fourth power semiconductor switches are actuatable bidirectional power semiconductor switches, each formed by an insulated gate bipolar transistor (IGBT) and by a diode connected back-to-back with the bipolar transistor. The fifth and sixth power semiconductor switches in DE 699 02 227 T2 are nonactuatable unidirectional power semiconductor switches, each formed by a diode. In this case, the fifth and sixth power semiconductor switches form a passive clamping switching group. However, it is also conceivable for the fifth and sixth power semiconductor switches to be actuatable bidirectional power semiconductor switches, each formed by an insulated gate bipolar transistor (IGBT) and by a diode connected back-to-back with the bipolar transistor. In that case, the fifth and sixth power semiconductor switches form an active clamping switching group.

DE 699 02 227 T2 also specifies a method for fault handling in a converter circuit for switching three voltage levels. First of all, in the event of a fault occurring, for example on account of a faulty power semiconductor switch, it is detected whether the fault is in a top fault current path or in a bottom fault current path in the converter circuit. In this context, the top fault current path is defined by a fault current through the first, second, third and sixth power semiconductor switches or by a fault current through the first and fifth power semiconductor switches. In addition, the bottom fault current path is defined by a fault current through the second, third, fourth and fifth power semiconductor switches or by a fault current through the fourth and sixth power semiconductor switches. For fault handling, a fault switching sequence is initially followed by the power semiconductor switch(es) which is/are in desaturation being turned off. This requires each power semiconductor switch being monitored for desaturation using a desaturation monitoring device. Such desaturation on the power semiconductor switch, particularly on the IGBT, occurs, by way of example, when a fault, such as a short, occurs in the principal current path, i.e. between the anode and the cathode or between the collector and the emitter of the IGBT. Other faults are naturally also conceivable. In such a fault situation, the current in the principal current path typically rises very quickly to a high current amplitude, which means that the current integral over time assumes inadmissibly high values. During this overcurrent which arises, the IGBT is driven to desaturation, with the anode/cathode voltage across the IGBT rising quickly, particularly to the value of the voltage which is to be connected. This achieves an extremely critical state for the IGBT: the IGBT firstly routes a high current (overcurrent) through the anode and the cathode in the principal current path. Secondly, a high anode/cathode voltage is simultaneously applied between the anode and the cathode of the IGBT. This results in an extremely high instantaneous power loss which can destroy the IGBT. When the desaturated power semiconductor switch(es) has/have been turned off, the power semiconductor switches are then switched on the basis of the fault switching sequence such that a phase short arises in each converter subsystem, i.e. the converter circuit is then shorted on each of its phases.

The short on all phases of the converter circuit from DE 699 02 227 T2 allows a short circuit current to be produced in the converter subsystem affected by the fault and in the other converter subsystems, however, said short circuit current placing a burden on the power semiconductor switches. A power semiconductor switch burdened in this manner can therefore age more quickly or can even be damaged, which means that the availability of the converter circuit is severely impaired or at worst is eliminated.

In addition, JP 11032426 discloses a method for fault handling in a converter circuit for switching three voltage levels. To avoid an overvoltage on one of the power semiconductor switches, detection of an overcurrent through the first and second power semiconductor switches and detection of an overcurrent through the third and fourth power semiconductor switches prompt first of all the first and fourth power semiconductor switches and then the second and third power semiconductor switches to be turned off.

SUMMARY

A method for fault handling in a converter circuit is disclosed for switching three voltage levels which essentially does not necessitate phase shorting of all the phases of the converter circuit in order to achieve a safe operating state for the converter circuit in the event of a fault.

One exemplary method for fault handling in a converter circuit for switching three voltage levels, the converter circuit has a converter subsystem provided for each phase and comprises a DC voltage circuit formed by two series-connected capacitors, where the DC voltage circuit comprises a first principal connection and a second principal connection and a subconnection formed by the two adjacent and interconnected capacitors. In addition, each converter subsystem has a first, a second, a third and a fourth actuatable bidirectional power semiconductor switch and a fifth and a sixth power semiconductor switch, the first, second, third and fourth power semiconductor switches being connected in series. The first power semiconductor switch is connected to the first principal connection and the fourth power semiconductor switch is connected to the second principal connection. In addition, the fifth and sixth power semiconductor switches are connected in series, the junction between the fifth power semiconductor switch and the sixth power semiconductor switch being connected to the subconnection, the fifth power semiconductor switch being connected to the junction between the first power semiconductor switch and the second power semiconductor switch, and the sixth power semiconductor switch being connected to the junction between the third power semiconductor switch and the fourth power semiconductor switch. The method additionally involves detection of a top fault current path or a bottom fault current path in the converter subsystem when a fault occurs in the converter subsystem, the top fault current path running through the first, second, third and sixth power semiconductor switches or through the first and fifth power semiconductor switches, and the bottom fault current path running through the second, third, fourth and fifth power semiconductor switches or through the fourth and sixth power semiconductor switches. In addition, the power semiconductor switches are switched on the basis of a fault switching sequence. The fault switching sequence in the event of detection of the top or bottom fault current path is followed by the detection's accompanying switching status of each actuatable bidirectional power semiconductor switch being recorded. The effect advantageously achieved by this is that there is first of all no further actuation of the actuatable bidirectional power semiconductor switches and hence also no switching action. In the event of detection of the top fault current path in the converted section system, the first power semiconductor switch and then the third power semiconductor in the converted section system can be turned off. In the event of detection of the bottom fault current path in the converted section system, the fourth power semiconductor switch and then the second power semiconductor switch in the converted section system can be turned off. Advantageously, the effect which may be achieved by this is that the converted section system affected by the fault and hence the entire converter circuit is put into a safe operating state. The power semiconductor switches in the converter circuit's converter systems which are not affected by the fault can be turned off. This allows formation of a short circuit current in the converter subsystem affected by the fault and any other converted section systems to be largely avoided, which means that the power semiconductor switches in the converter subsystem affected by the fault and also those in the other converter subsystems are subjected to less of the burden. The ageing of the power semiconductor switches can therefore advantageously be slowed down and damage to the power semiconductor switches can be largely prevented. Overall, this increases the availability of the converter circuit.

In one aspect, turning off the relevant two power semiconductor switches upon detection of a top or bottom fault current path advantageously produces a freewheeling path for the load current flowing in normal operation of the converter circuit, the DC voltage circuit also advantageously being protected against a short as a result of the relevant two power semiconductor switches being turned off.

BRIEF DESCRIPTION OF THE DRAWINGS

This and other features and aspects will become obvious from the detailed description of various exemplary embodiments which follows in conjunction with the drawings. In the drawings.

The reference symbols used in the drawing and their meaning are listed in summarized form in the list of reference symbols. In principle, identical parts have been provided with the same reference symbols in the figures. The embodiments described are examples of the subject matter of the invention and have no restrictive effect.

DETAILED DESCRIPTION

FIG. 1a shows the exemplary converter subsystem 1 in a converter circuit for switching three voltage levels. The converter circuit has a converter subsystem 1 provided for each phase R, S, T, FIG. 1a showing just one converter subsystem 1 for the phase R. The converter circuit comprises a DC voltage circuit 2 formed by two series-connected capacitors, the DC voltage circuit 2 having a first principle connection 3 and a second principle connection 4 and a subconnection 5 formed by the two adjacent and interconnected capacitors. In addition, the converter subsystem 1 has a first, a second, a third and a fourth actuatable bi directional power semiconductor switch S1, S2, S3, S4 and a fifth and a sixth power semiconductor switch S5, S6. The respective actuable bidirectional power semiconductor switch S1, S2, S3, S4 is, in particular, formed by an insulated gate bipolar transistor (IGBT) and by a diode connected back-to-back with the bipolar transistor. However, it is also conceivable for an actuatable bidirectional power semiconductor switch as mentioned above to be in the form of a power MOSFET with an additionally back-to-back connected diode, for example. In line with FIG. 1a, the fifth and sixth power semiconductor switches S5, S6 are nonactuatable unidirectional power semiconductor switches, each formed by a diode. In this case, the fifth and sixth power semiconductor switches form a passive clamping switching group.

As FIG. 1a shows, the first, second, third and fourth power semiconductor switches S1, S2, S3, S4 are connected in series and the first power semiconductor switch S1 is connected to the first principal connection 3 and the fourth power semiconductor switch S4 is connected to the second principal connection 4. In addition, the fifth and sixth power semiconductor switches S5, S6 are connected in series, the junction between the fifth power semiconductor switch S5 and the sixth power semiconductor switch S6 being connected to the subconnection 5, the fifth power semiconductor switch S6 being connected to the junction between the first power semiconductor switch S1 and the second power semiconductor switch S2, and the sixth power semiconductor switch S6 being connected to the junction between the third power semiconductor switch S3 and the fourth power semiconductor switch S4.

Figure 1B:
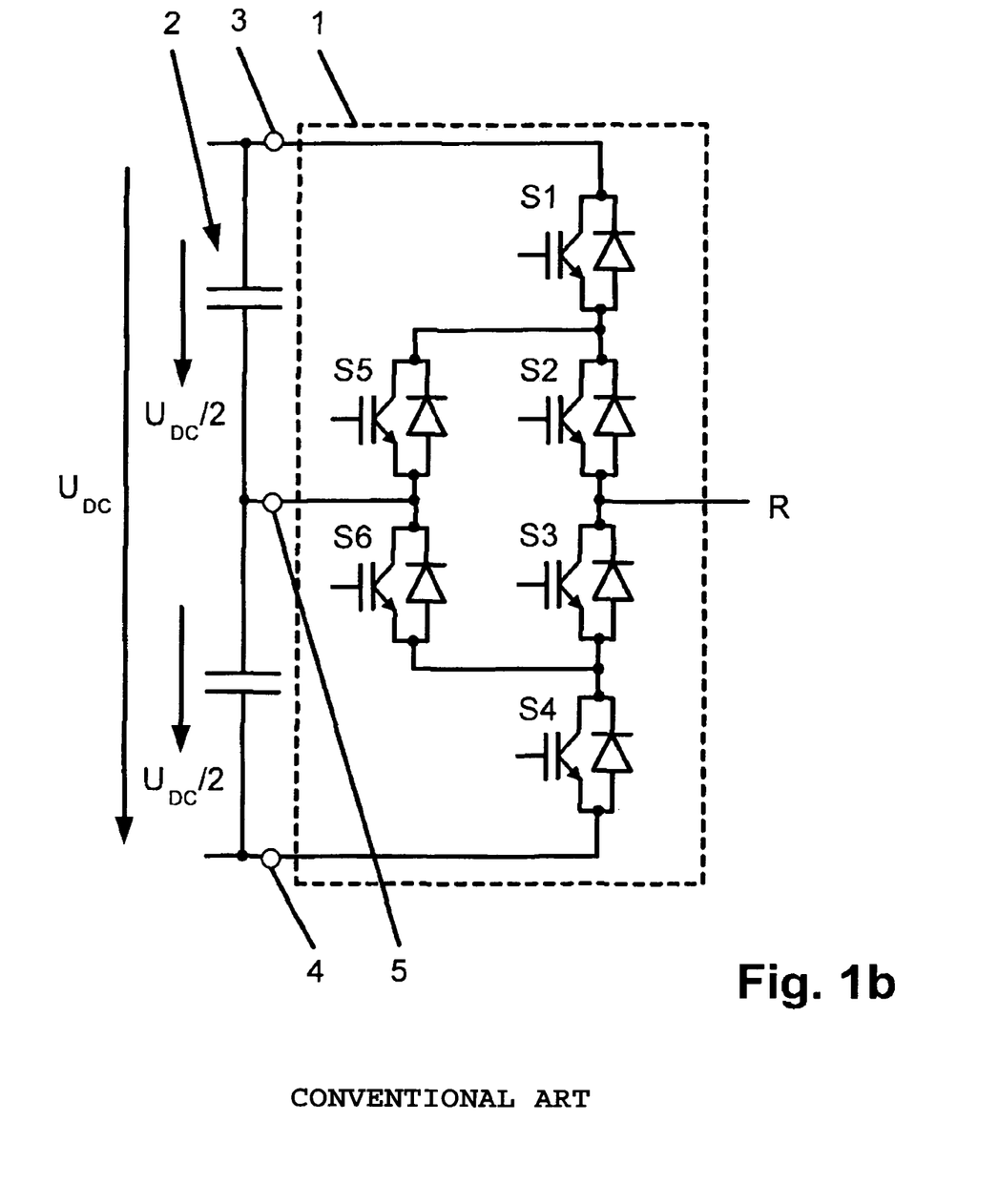
FIG. 1b shows another exemplary converter subsystem in a known converter circuit for switching three voltage levels.

FIG. 1b shows another exemplary converter subsystem 1 in a converter circuit for switching three voltage levels. In contrast to the exemplary converter subsystem shown in FIG. 1a, the fifth and sixth power semiconductor switches S5, S6 are likewise actuatable bi directional power semiconductor switches, each formed by an insulated gate bipolar transistor (IGBT) and by a diode connected back-to-back with the bipolar transistor. As FIG. 1b shows, the fifth and sixth power semiconductor switches S5, S6 then form an active clamping switching group.

Figure 2A:
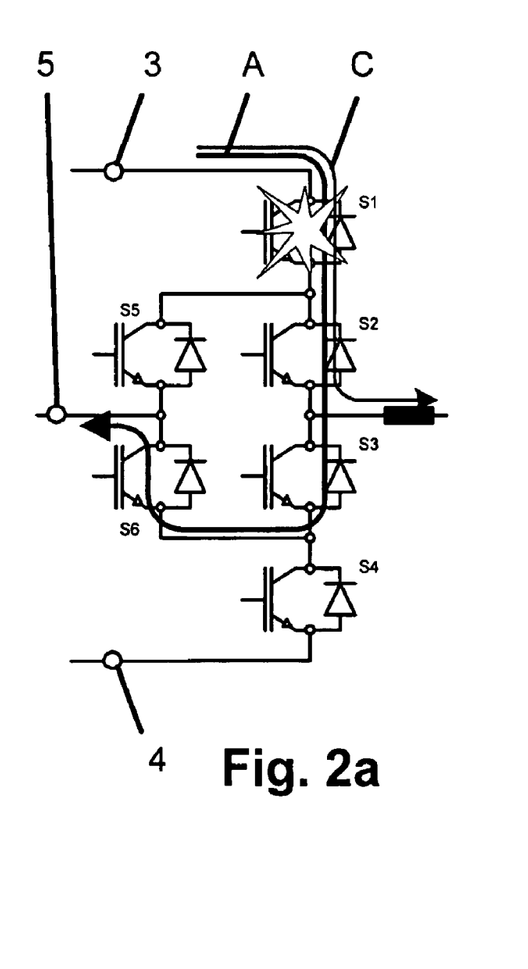
FIG. 2a shows an example of current formation in a converter subsystem as shown in FIG. 1b in the event of a fault in the first power semiconductor switch in the converter subsystem.

In Applicants' exemplary method for fault handling in the converter circuit for switching three voltage levels, the occurrence of a fault in the converter subsystem 1 now prompts a top fault current path A or a bottom fault current path B in the converter subsystem 1 to be detected, the top fault current path A running through the first, second, third and sixth power semiconductor switches S1, S2, S3, S6 or through the first and fifth power semiconductor switches S1, S5, and the bottom fault current path running through the second, third, fourth and fifth power semiconductor switches S2, S3, S4, S5 or through the fourth and sixth power semiconductor switches S4, S6. In addition, the actuatable bidirectional power semiconductor switches S1, S2, S3, S4, S5, S6, i.e. in accordance with the embodiment shown in FIG. 1a the power semiconductor switches S1, S2, S3 and S4 and in accordance with the embodiment shown in FIG. 1b the power semiconductor switches S1, S2, S3, S4, S5 and S6, are switched on the basis of a fault switching sequence. By way of example, FIG. 2a shows current formation in the converter subsystem shown in FIG. 1b in the event of a fault in the first power semiconductor switch S1 in the converter subsystem 1, which faulty first power semiconductor switch S1 is identified by a star. In this case, one of the top fault current paths A forms through the first, second, third and sixth power semiconductor switches S1, S2, S3, S6, for example, as already mentioned above. In addition, the original current path, before the fault, for the load current C in respect of the phase is also shown in FIG. 2a for the sake of completeness.

In one aspect of the Applicants' exemplary method, the fault switching sequence in the event of detection of the top or bottom fault current path A, B is followed by the detection's accompanying switching status of each actuatable bidirectional power semiconductor switch S1, S2, S3, S4 being recorded. Advantageously, the effect achieved by this is that first of all there is no further actuation of the actuatable bidirectional power semiconductor switches S1, S2, S3, S4 and hence also no switching action. In addition, in the event of detection of the top fault current path A, the fault switching sequence is followed by the first power semiconductor switch S1 and then the third power semiconductor switch S3 being turned off. Furthermore, in the event of detection of the bottom fault current path B, the fault switching sequence is followed by the fourth power semiconductor switch S4 and then the second power semiconductor switch S2 being turned off. The converter subsystem 1 affected by the fault and hence the entire converter circuit are advantageously put into a safe operating state as a result of the measures described above. Formation of a short circuit current in the converter subsystem 1 affected by the fault and in the other converter subsystems 1 can therefore be avoided almost entirely, which means that the power semiconductor switches S1, S2, S3, S4, S5, S6 in the converter subsystem 1 affected by the fault and also those in the other converter subsystems 1 for the other phases R, S, T are subjected to less of a burden. The ageing of the power semiconductor switches S1, S2, S3, S4, S5, S6 can therefore advantageously be slowed down or damage to the power semiconductor switches S1, S2, S2, S4, S5, S6 can be largely prevented. Overall, this increases the availability of the converter circuit. In addition, maintenance of the converter circuit is simplified, since normally a fault damages fewer power semiconductor switches S1, S2, S3, S4, S5, S6 and hence it is also necessary to replace fewer power semiconductor switches S1, S2, S3, S4, S5, S6.

Figure 2B:
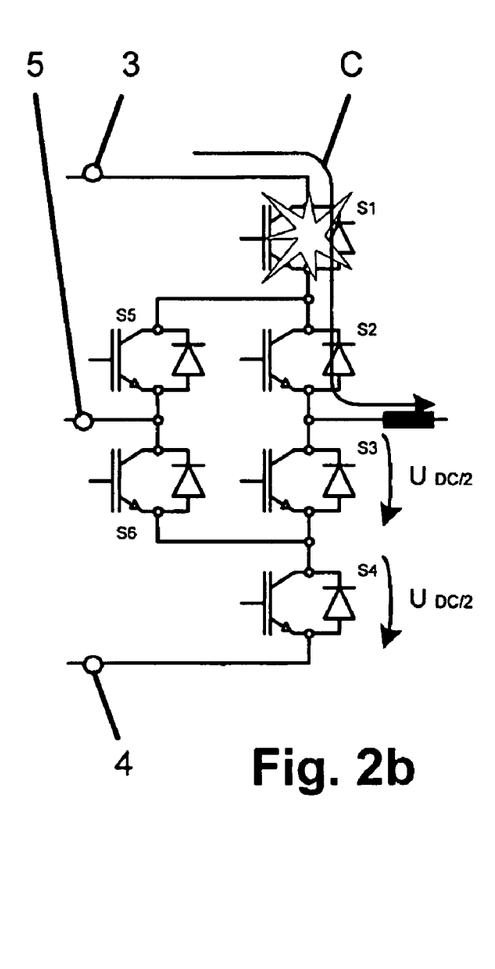
FIG. 2b shows current formation in the event of a fault as shown in FIG. 2a following a fault switching sequence in line with an exemplary method for fault handling.

In another aspect of the Applicants' exemplary method, turning off the relevant two power semiconductor switches S1, S2, S3, S4 upon detection of a top or bottom fault current path A, B advantageously produces a freewheeling path for the load current C flowing in normal operation of the converter circuit, the DC voltage circuit also advantageously being protected against a short as a result of the relevant two power semiconductor switches being turned off. In this regard, FIG. 2b shows, by way of example, current formation in the event of a fault as shown in FIG. 2a following the fault switching sequence, described in more detail above, in line with the inventive method for fault handling. In this figure, the first power semiconductor switch S1 and the third power semiconductor switch S3 are turned off, the fourth power semiconductor switch S4 being turned off anyway and the third and fourth power semiconductor switches S3, S4 respectively having half the DC voltage $U_{DC}/2$ of the DC voltage circuit applied to them, and the load current C flowing through the faulty first and second power semiconductor switches S1, S2 as before the fault in the first power semiconductor switch S1. The overall effect achieved by this is therefore a safe operating state for the converter subsystem 1 affected by the fault and hence also for the entire converter circuit.

Figure 3A:
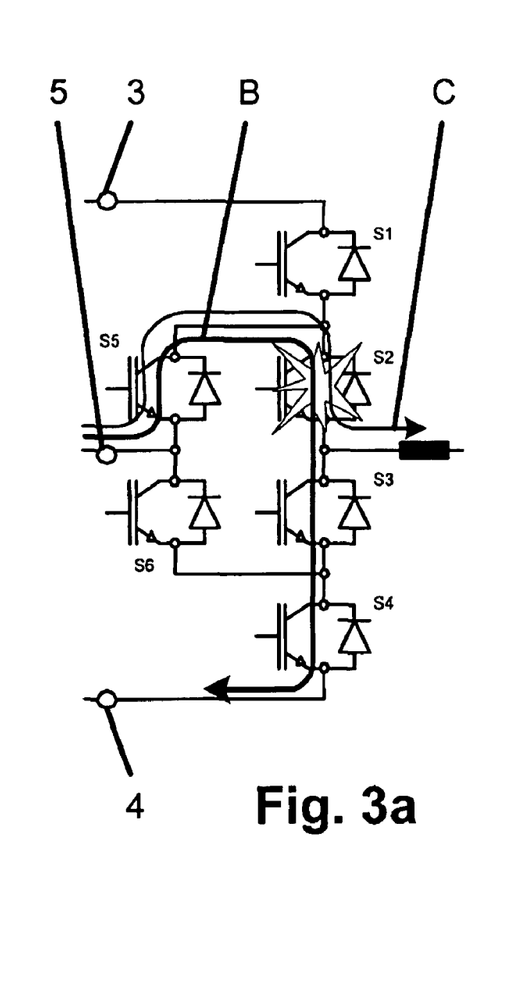
FIG. 3a shows an example of current formation in a converter subsystem as shown FIG. 1b in the event of a fault in the second power semiconductor switch in the converter subsystem.
Figure 3B:
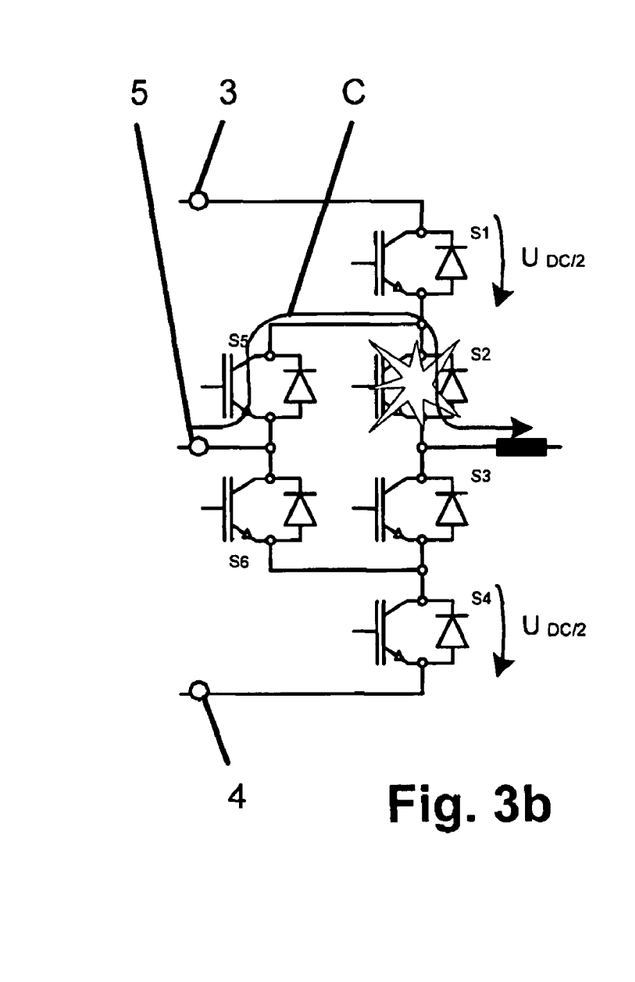
FIG. 3b shows current formation in the event of a fault as shown in FIG. 3a following a fault switching sequence in line with an exemplary method for fault handling.

By way of example, FIG. 3a shows current formation in an exemplary converter subsystem 1 shown in FIG. 1b in the event of a fault in the second power semiconductor switch S2 of the converter subsystem 1, said faulty second power semiconductor switch S2 being identified by a star. In this case, one of the bottom fault current paths B forms through the second, third, fourth and fifth power semiconductor switches S2, S3, S4, S5, for example, as already mentioned above. In addition, the original current path, before the fault, for the load current C in respect of the phase is also shown in FIG. 3a for the sake of completeness. Finally, FIG. 3b shows current formation in the event of a fault as shown in FIG. 3a by way of example following the fault switching sequence, described in more detail above, on the basis of the inventive method for fault handling. In this figure, the fourth power semiconductor switch S4 and the second power semiconductor switch S2 are turned off, the first power semiconductor switch S1 being turned off anyway, the first and fourth power semiconductor switches S1, S4 respectively having half the DC voltage $U_{DC}/2$ of the DC voltage circuit applied to them and the load current C flowing through the fifth and faulty second power semiconductor switches S5, S2, as before the fault in the second power semiconductor switch S2. The overall effect achieved by this is a safe operating state for the converter subsystem 1 affected by the fault and hence also for the entire converter circuit even when there is a fault in the bottom fault current path B.

In FIG. 1b, the fifth and sixth power semiconductor switches S5, S6 are respectively an actuatable bidirectional power semiconductor switch. In the case of the inventive method, detection of the top fault current path A after the fault switching sequence now prompts the sixth power semiconductor switch S6 to be turned on before the first power semiconductor switch S1 is turned off, particularly if the sixth power semiconductor switch S6 had not previously been turned on. In the event of detection of the bottom fault current path B, the fault switching sequence is followed by the fifth power semiconductor switch S5 being turned on before the fourth power semiconductor switch S4 is turned off, particularly if the fifth power semiconductor switch S5 had not previously been turned on. This achieves the aforementioned safe operating state for the converter subsystem shown in FIG. 1b and hence for the entire converter circuit.

It has been found to be advantageous that in the event of detection of the top fault current path A the third power semiconductor switch S3 is turned off with a selectable delay time $t_v$ relative to the first power semiconductor switch S1, and that in the event of detection of the bottom fault current path B the second power semiconductor switch S2 is turned off with a selectable delay time $t_v$ relative to the fourth power semiconductor switch S4. This ensures that the first power semiconductor switch S1 is already turned off when the third power semiconductor switch S3 is turned off, and that the fourth power semiconductor switch S4 is already turned off when the second power semiconductor switch S2 is turned off. Preferably, the delay time $t_v$ is selected in the order of magnitude of between 1 µs and 5 µs.

In one aspect of the Applicants' exemplary method, the actuatable bidirectional power semiconductor switches S1, S2, S3, S4, S5, S6 in the converter circuit's converter subsystems 1 which are not effected by the fault are turned off, which means that it is also possible to ensure that a short circuit current is not produced in the converter subsystems 1 which are not effected by the fault, as occurs in methods based on the prior art through shorting of all the phases R, S, T of the converter circuit. The power semiconductor switches S1, S2, S3, S4, S5, S6 in the converter subsystems 1 which are not effected by the fault are thus subjected to less of a burden in comparison with known methods. Preferably, when the actuatable bidirectional power semiconductor switches S1, S2, S3, S4, S5, S6 in the converter circuit's converter subsystems 1 which are not effected by the fault are turned off, the respective "outer" actuatable bidirectional power semiconductor switch S1, S4, i.e. the first or the fourth actuatable bidirectional power semiconductor switch S1, S4, is turned off before the associated "inner" actuatable bidirectional power semiconductor switch S2, S3, i.e. the second or third actuatable bidirectional semiconductor power switch S2, S3.

The text below discusses the detection options for the top and bottom fault current paths A, B in more detail.

To detect the top or bottom fault current path A, B, the invention involves each actuatable bidirectional power semiconductor switch S1, S2, S3, S4, S5, S6 in the converter subcircuits 1 for the phases R, S, T being monitored for desaturation and also a current through the subconnection 5 in each converter subcircuit 1 being monitored for its direction. To monitor the direction of the current through the subconnection 5, the current is preferably monitored for a threshold value or is compared with a threshold value in order to ensure that the direction of the current is detected even when the current is subjected to noise. The top fault current path A is detected when the first, second, third, fifth or sixth actuatable bidirectional power semiconductor switch S1, S2, S3, S5, S6 is in desaturation and a current through the subconnection 5 is detected in the direction of the DC voltage circuit 2. By contrast, the bottom fault current path B is detected when the second, third, fourth, fifth or sixth actuatable bidirectional power semiconductor switch S2, S3, S4, S5, S6 is in desaturation and there is a current through the subconnection 5 from the direction of the DC voltage circuit 2. To monitor the direction of flow of the current through the subconnection 5, the subconnection 5 preferably has an appropriate sensor provided on it.

As an alternative to the detection of the top or bottom fault current path A, B described above, each actuatable bidirectional power semiconductor switch S1, S2, S3, S4, S5, S6 is likewise monitored for desaturation, but with a current through the first principal connection 3 and a current through the second principal connection 4 being monitored. To monitor the respective current through the first principal connection 3 or through the second principal connection 4, the respective current is preferably monitored for a threshold value in order to ensure detection of the respective current even when the current is subject to noise. The top fault current path A is detected when the first, second, third, fifth or sixth actuatable bidirectional power semiconductor switch S1, S2, S3, S5, S6 is in desaturation and a current is detected through the first principal connection 3. By contrast, the bottom fault current path B is detected when the second, third, fourth, fifth or sixth actuatable bidirectional power semiconductor switch S2, S3, S4, S5, S6 is in desaturation and there is a current through the second principal connection 4. To monitor the current in the top or bottom fault current path A, B, the first principal connection 3 and the second principal connection 4 preferably have an appropriate sensor provided on them which needs to be capable of detecting only a current but not a direction for the current. A current sensor of this kind is of simple and hence robust design.

Figure 4A:
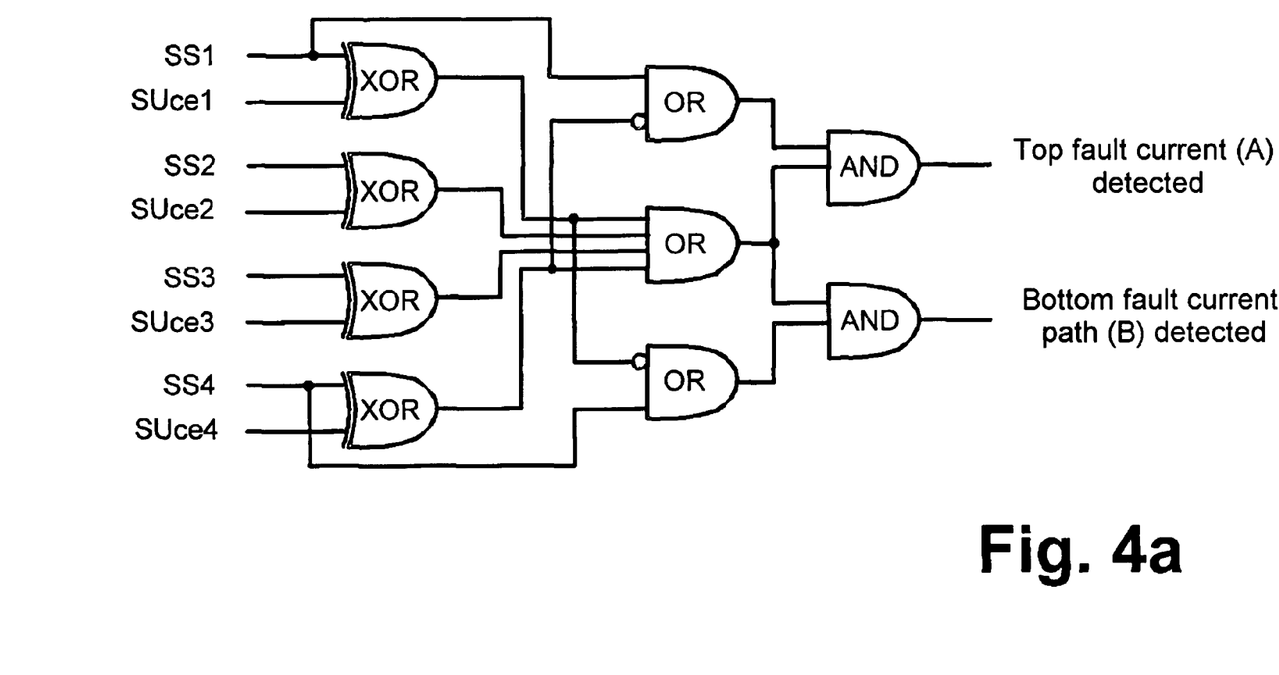
FIG. 4a shows an example of a logic circuit for detecting a top and a bottom fault current path for a converter subsystem as shown in FIG. 1a, and FIG. 4b shows an example of a logic circuit for detecting a top and a bottom fault current path for a converter subsystem as shown in FIG. 1b.
Figure 4B:
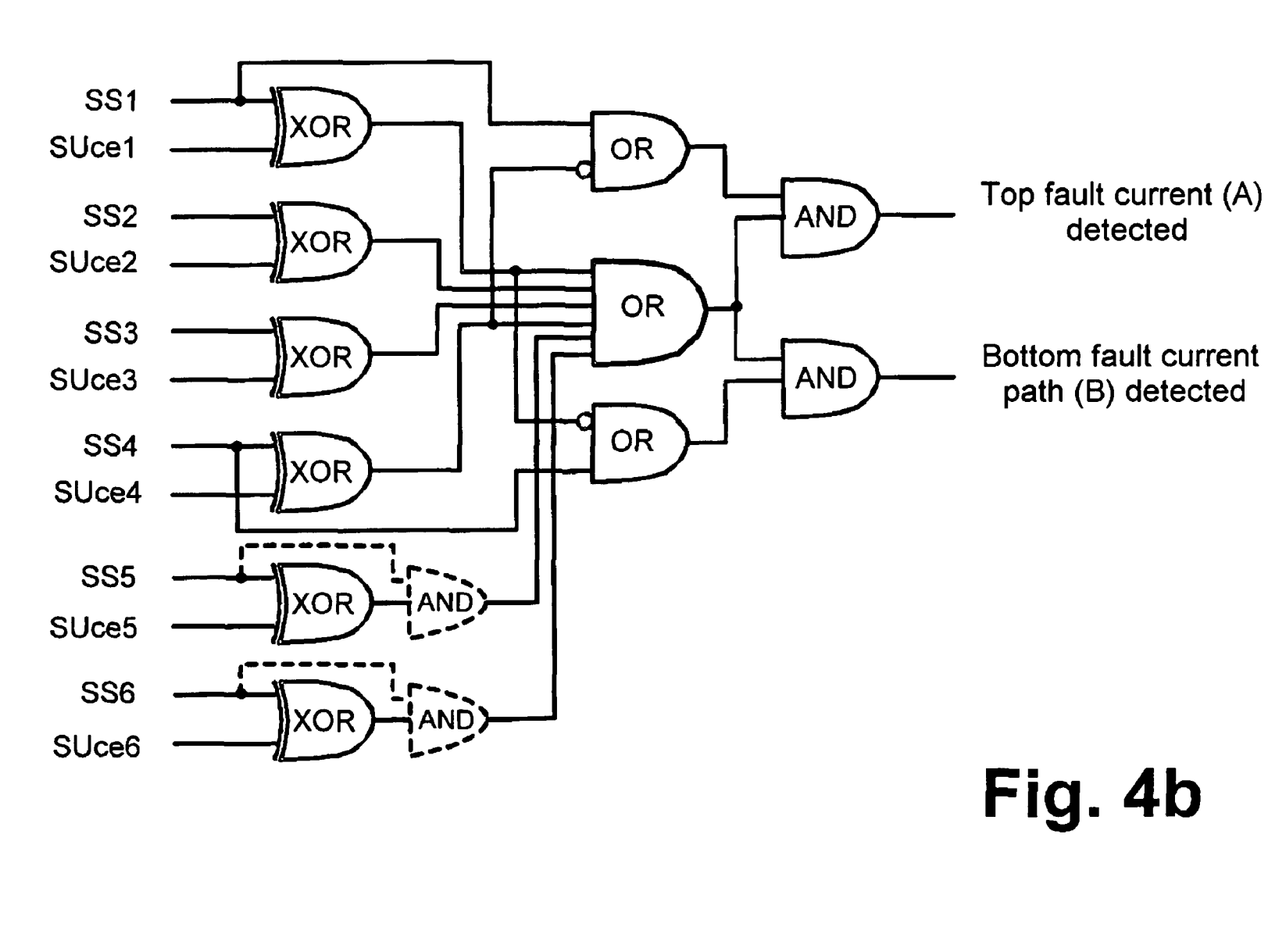

As an alternative to the detection of the top or bottom fault current path A, B described above, the anode/cathode voltage Uce of each actuatable bidirectional power semiconductor switch S1, S2, S3, S4, S5, S6 in general is first of all monitored for a threshold value Uce,th. Specifically, this anode/cathode voltage monitoring is performed in the actuatable bidirectional power semiconductor switches S1, S2, S3 and S4 in the case of the converter subsystem 1 shown in FIG. 1a and in the actuatable bidirectional power semiconductor switches S1, S2, S3, S4, S5 and S6 in the case of the converter subsystem 1 shown in FIG. 1b. FIG. 4a shows an exemplary logic circuit for detecting a top and a bottom fault current path A, B for the converter subsystem 1 shown in FIG. 1a. In addition, FIG. 4b shows an exemplary logic circuit for detecting a top and a bottom fault current path for the converter subsystem 1 shown in FIG. 1b. The switching status signals SS1, SS2, SS3 and SS4 shown in FIG. 4a for the actuatable bidirectional power semiconductor switches S1, S2, S3 and S4 and the switching status signals SS1, SS2, SS3, SS4, SS5 and SS6 shown in FIG. 4b for the actuatable bidirectional power semiconductor switches S1, S2, S3, S4, S5 and S6 are logical variables, the switching status signal SS1, SS2, SS3, SS4, SS5, SS6 being logic "0" for a turned-off associated actuatable bidirectional power semiconductor switch S1, S2, S3, S4, S5, S6 and logic "1" for a turned-on associated actuatable bidirectional power semiconductor switch S1, S2, S3, S4, S5, S6. In addition, the threshold value signals SUce1, SUce2, SUce3 and SUce4 shown in FIG. 4a for the actuatable bidirectional power semiconductor switches S1, S2, S3, S4 monitored for the threshold value Uce,th of the associated anode/cathode voltage Uce and the threshold value signals SUce1, SUce2, SUce3, SUce4, SUce5 and SUce6 shown in FIG. 4b for the associated actuatable bidirectional power semiconductor switches S1, S2, S3, S4, S5, S6 are logic variables, the threshold value signal SUce1, SUce2, SUce3, SUce4, SUceS, SUce6 being logic "0" for an anode/cathode voltage Uce of the relevant power semiconductor switch S1, S2, S3, S4, S5, S6 which exceeds the threshold value SUce and logic "1" for an anode/cathode voltage Uce of the relevant power semiconductor switch S1, S2, S3, S4, S5, S6 which undershoots the threshold value Uce,th.

In another aspect of the Applicants' exemplary method, the top fault current path A is now detected when the threshold value Uce,th is exceeded with one or more actuatable bidirectional power semiconductor switches S1, S2, S3, S4, S5, S6 turned on and the fourth actuatable bidirectional power semiconductor switch S4 turned off when the threshold value Uce,th is exceeded, or when the threshold value Uce,th is exceeded with one or more actuatable bidirectional power semiconductor switches S1, S2, S3, S4, S5, S6 turned on and the first actuatable bidirectional power semiconductor switch S1 turned on. In addition, in line with the invention, the top fault current path A is also detected when the threshold value Uce,th is undershot with one or more actuatable bidirectional power semiconductor switches S1, S2, S3, S4 turned off and the fourth actuatable bidirectional power semiconductor switch S4 turned off when the threshold value Uce,th is exceeded, or when the threshold value Uce,th is undershot with one or more actuatable bidirectional power semiconductor switches S1, S2, S3, S4 turned off and the first actuatable bidirectional power semiconductor switch S1 turned on.

By contrast, in yet another aspect of the Applicants' exemplary method, the bottom fault current path B is detected when the threshold value Uce,th is exceeded with one or more actuatable bidirectional power semiconductor switches S1, S2, S3, S4, S5, S6 turned on and the first actuatable bidirectional power semiconductor switch S1 turned off when the threshold value Uce,th is exceeded, or when the threshold value Uce,th is exceeded with one or more actuatable bidirectional power semiconductor switches S1, S2, S3, S4, S5, S6 turned on and the fourth actuatable bidirectional power semiconductor switch S4 turned on. In addition, in line with the invention, the bottom fault current path B is also detected when the threshold value Uce,th is undershot with one or more actuatable bidirectional power semiconductor switches S1, S2, S3, S4 turned off and the first actuatable bidirectional power semiconductor switch S1 turned off when the threshold value Uce,th is exceeded, or when the threshold value Uce,th is undershot with one or more actuatable bidirectional power semiconductor switches S1, S2, S3, S4 turned off and the fourth actuatable bidirectional power semiconductor switch S4 turned on. Advantageously, this type of detection of the top and bottom fault current paths A, B makes it possible to dispense with current sensors for detection completely, which means that the wiring and materials involvement can advantageously be reduced and the converter subsystem can thus be of simple and less expensive design. Furthermore, the susceptibility of the converter subsystem 1 and hence of the entire converter circuit to interference is advantageously reduced, which results in increased availability for the entire converter circuit.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Converter subsystem
2 DC voltage circuit
3 First principal connection
4 Second principal connection
5 Subconnection
S1 First power semiconductor switch
S2 Second power semiconductor switch
S3 Third power semiconductor switch
S4 Fourth power semiconductor switch
S5 Fifth power semiconductor switch
S6 Sixth power semiconductor switch
A Top fault current path
B Bottom fault current path
C Load current path

The invention claimed is:

1. A method for fault handling in a converter circuit for switching three voltage levels, in which the converter circuit has a converter subsystem provided for each phase (R,S,T) and comprises a DC voltage circuit formed by two series-connected capacitors, where the DC voltage circuit comprises a first principal connection and a second principal connection and a subconnection formed by the two adjacent and interconnected capacitors, and which said converter subsystem has a first, a second, a third and a fourth actuatable bidirectional power semiconductor switch and a fifth and a sixth power semiconductor switch, the first, second, third and fourth power semiconductor switches being connected in series and the first power semiconductor switch being connected to the first principal connection and the fourth power semiconductor switch being connected to the second principal connection, and where the fifth and sixth power semiconductor switches are connected in series, the junction between the fifth power semiconductor switch and the sixth power semiconductor switch is connected to the subconnection, the fifth power semiconductor switch is connected to the junction between the first power semiconductor switch and the second power semiconductor switch, and the sixth power semiconductor switch is connected to the junction between the third power semiconductor switch and the fourth power semiconductor switch, in which a top fault current path (A) or a bottom fault current path (B) in the converter subsystem is detected, the top fault current path (A) running through the first, second, third and sixth power semiconductor switches or through the first and fifth power semiconductor switches, and the bottom fault current path running through the second, third, fourth and fifth power semiconductor switches or through the fourth and sixth power semiconductor switches, and in which the actuatable bidirectional power semiconductor switches are switched on the basis of a fault switching sequence, wherein the fault switching sequence in the event of detection of the top or the bottom fault current path (A, B) is followed by the detection's accompanying switching status of each actuatable bidirectional power semiconductor switch being recorded, wherein in the event of detection of the top fault current path (A) the first power semiconductor switch and then the third power semiconductor are turned off, and wherein in the event of detection of the bottom fault current path (B) the fourth power semiconductor switch and then the second power semiconductor are turned off.

2. The method as claimed in claim 1, wherein the fifth and sixth power semiconductor switches are actuatable bidirectional power semiconductor switches, and in the event of detection of the top fault current path (A) the sixth power semiconductor switch is turned on before the first power semiconductor switch is turned off, and in the event of detection of the bottom fault current path (B) the fifth power semiconductor switch is turned on before the fourth power semiconductor switch is turned off.

3. The method as claimed in claim 2, wherein in the event of detection of the top fault current path (A) the third power semiconductor switch is turned off with a selectable delay time ($t_v$) relative to the first power semiconductor switch, and in that in the event of detection of the bottom fault current path (B) the second power semiconductor switch is turned off with a selectable delay time ($t_v$) relative to the fourth power semiconductor switch.

4. The method as claimed in claim 3, wherein the delay time ($t_v$) is selected in the order of magnitude of between 1 μs and 5 μs.

5. The method as claimed in claim 4, wherein the actuatable bidirectional power semiconductor switches in the converter subsystems which are not affected by the fault are turned off.

6. The method as claimed in claim 5, wherein to detect the top or bottom fault current path (A, B) each actuatable bidirectional power semiconductor switch is monitored for desaturation, and wherein a current through the subconnection is monitored for its direction.

7. The method as claimed in claim 6, wherein the top fault current path (A) is detected in the case of desaturation of the first, second, third, fifth or sixth actuatable bidirectional power semiconductor switch and a current through the subconnection in the direction of the DC voltage circuit, and wherein the bottom fault current path (B) is detected in the case of desaturation of the second, third, fourth, fifth or sixth actuatable bidirectional power semiconductor switch and a current through the subconnection from the direction of the DC voltage circuit.

8. The method as claimed in claim 5, wherein to detect the top or bottom fault current path (A, B) each actuatable bidirectional power semiconductor switch is monitored for desaturation, and wherein a current through the first principal connection and a current through the second principal connection are monitored.

9. The method as claimed in claim 8, wherein the top fault current path (A) is detected in the case of desaturation of the first, second, third, fifth or sixth actuatable bidirectional power semiconductor switch and a current through the first principal connection, and wherein the bottom fault current path (B) is detected in the case of desaturation of the second, third, fourth, fifth or sixth actuatable bidirectional power semiconductor switch and a current through the second principal connection.

10. The method as claimed in claim 5, wherein the anode/cathode voltage (Uce) of each actuatable bidirectional power semiconductor switch is monitored for a threshold value (Uce, th), and wherein the top fault current path (A) detected (a1) when the threshold value (Uce,th) is exceeded with one or more actuatable bidirectional power semiconductor switches turned on and the fourth actuatable bidirectional power semiconductor switch turned off when the threshold value (Uce, th) is exceeded, or (b1) when the threshold value (Uce,th) is exceeded with one or more actuatable bidirectional power semiconductor switches turned on and the first actuatable bidirectional power semiconductor switch (S1) turned on, or (c1) when the threshold value (Uce,th) is undershot with one or more actuatable bidirectional power semiconductor switches turned off and the fourth actuatable bidirectional power semiconductor switch turned off when the threshold value (Uce,th) is exceeded, or (d1) when the threshold value (Uce,th) is undershot with one or more actuatable bidirectional power semiconductor switches turned off and the first actuatable bidirectional power semiconductor switch turned on, and in that the bottom fault current path (B) is detected (a2) when the threshold value (Uce,th) is exceeded with one or more actuatable bidirectional power semiconductor switches turned on and the first actuatable bidirectional power semiconductor switch (S1) turned off when the threshold value (Uce,th) is exceeded, or (b2) when the threshold value (Uce,th) is exceeded with one or more actuatable bidirectional power semiconductor switches turned on and a fourth actuatable bidirectional power semiconductor switch turned on, or (c2) when the threshold value (Uce,th) is undershot with one or more actuatable bidirectional power semiconductor switches turned off and the first actuatable bidirectional power semiconductor switch turned off when the threshold value (Uce,th) is exceeded, or (d2) when the threshold value (Uce,th) is undershot with one or more actuatable bidirectional power semiconductor switches turned off and the fourth actuatable bidirectional power semiconductor switch turned on.

11. The method as claimed in claim 1, wherein in the event of detection of the top fault current path (A) the third power semiconductor switch is turned off with a selectable delay time ($t_v$) relative to the first power semiconductor switch, and in that in the event of detection of the bottom fault current path (B) the second power semiconductor switch is turned off with a selectable delay time ($t_v$) relative to the fourth power semiconductor switch.

12. The method as claimed in claim 1, wherein the actuatable bidirectional power semiconductor switches in the converter subsystems which are not affected by the fault are turned off.

13. The method as claimed in claim 1, wherein to detect the top or bottom fault current path (A, B) each actuatable bidirectional power semiconductor switch is monitored for desaturation, and wherein a current through the subconnection is monitored for its direction.

14. The method as claimed in claim 1, wherein to detect the top or bottom fault current path (A, B) each actuatable bidirectional power semiconductor switch is monitored for desaturation, and wherein a current through the first principal connection and a current through the second principal connection are monitored.

15. The method as claimed in claim 1, wherein the anode/cathode voltage (Uce) of each actuatable bidirectional power semiconductor switch is monitored for a threshold value (Uce, th), and wherein the top fault current path (A) is detected
- (a1) when the threshold value (Uce,th) is exceeded with one or more actuatable bidirectional power semiconductor switches turned on and the fourth actuatable bidirectional power semiconductor switch turned off when the threshold value (Uce,th) is exceeded, or
- (b1) when the threshold value (Uce,th) is exceeded with one or more actuatable bidirectional power semiconductor switches turned on and the first actuatable bidirectional power semiconductor switch (S1) turned on, or
- (c1) when the threshold value (Uce,th) is undershot with one or more actuatable bidirectional power semiconductor switches turned off and the fourth actuatable bidirectional power semiconductor switch turned off when the threshold value (Uce,th) is exceeded, or
- (d1) when the threshold value (Uce,th) is undershot with one or more actuatable bidirectional power semiconductor switches turned off and the first actuatable bidirectional power semiconductor switch turned on, and in that the bottom fault current path (B) is detected
- (a2) when the threshold value (Uce,th) is exceeded with one or more actuatable bidirectional power semiconductor switches turned on and the first actuatable bidirectional power semiconductor switch (S1) turned off when the threshold value (Uce,th) is exceeded, or
- (b2) when the threshold value (Uce,th) is exceeded with one or more actuatable bidirectional power semiconductor switches turned on and a fourth actuatable bidirectional power semiconductor switch turned on, or
- (c2) when the threshold value (Uce,th) is undershot with one or more actuatable bidirectional power semiconductor switches turned off and the first actuatable bidirectional power semiconductor switch turned off when the threshold value (Uce,th) is exceeded, or
- (d2) when the threshold value (Uce,th) is undershot with one or more actuatable bidirectional power semiconductor switches turned off and the fourth actuatable bidirectional power semiconductor switch turned on.

* * * * *